(12) EX PARTE REEXAMINATION CERTIFICATE (10667th)

United States Patent
Watanuki et al.

(10) Number: US 6,460,386 C1
(45) Certificate Issued: Jul. 21, 2015

(54) ELECTRONIC KEY STRUCTURE

(75) Inventors: Yoshio Watanuki, Kanagawa-ken (JP);
Satoshi Ogata, Kanagawa-ken (JP);
Tetsuyuki Tsukano, Kanagawa-ken (JP)

(73) Assignees: NISSAN MOTOR CO., LTD.,
Kanagawa-Ku, Yokohama-Shi,
Kanagawa-Ken (JP); **ALPHA
CORPORATION**, Kanazawa-Ku,
Yokohma-Shi, Kanagawa-Ken (JP)

Reexamination Request:
No. 90/013,108, Dec. 31, 2013

Reexamination Certificate for:
Patent No.: 6,460,386
Issued: Oct. 8, 2002
Appl. No.: 09/590,171
Filed: Jun. 9, 2000

(30) Foreign Application Priority Data

Jun. 11, 1999 (JP) .................................... 11-165682

(51) Int. Cl.
*B60R 25/04* (2013.01)
*E05B 19/00* (2006.01)
*E05B 19/04* (2006.01)
*G07C 9/00* (2006.01)
*B60R 25/24* (2013.01)

(52) U.S. Cl.
CPC ................. *B60R 25/04* (2013.01); *B60R 25/24* (2013.01)

(58) Field of Classification Search
USPC ................................................. 70/456 R, 408
See application file for complete search history.

(56) References Cited

To view the complete listing of prior art documents cited during the proceeding for Reexamination Control Number 90/013,108, please refer to the USPTO's public Patent Application Information Retrieval (PAIR) system under the Display References tab.

*Primary Examiner* — Patricia Engle

(57) ABSTRACT

A mechanical key (17) is housed in a mechanical key storing part (15) offset to one side within a key body (1), a bulge (18a) of a key head (18) being housed in an extension part (16a) of an aperture (16), a bridging part (19) that forms a holder linking hole (20) being formed so as to protrude at just the center of the rear end surface of the key body (1) thereby establishing left-to-right symmetry and avoiding an unbalanced appearance. Because the key head (18) of the mechanical key (17) can be formed so that the lever length from the key center axis line is large, it is possible to lighten the key rotational force when the mechanical key is used.

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, 3, 5 and 8 are determined to be patentable as amended.

Claims 4, 6, 7 and 9, dependent on an amended claim, are determined to be patentable.

New claims 10 and 11 are added and determined to be patentable.

1. An electronic key structure for electronic keys in which a key body is formed with a mechanical key storing part for at least a key plate part of a mechanical key to be stored therein, and the mechanical key is insertable into and removable from the mechanical key storing part, wherein the mechanical key storing part is located at one side of the key body, an aperture thereof is formed at a rear end surface of the key body, a key head of the mechanical key is formed with a bulge [bulging at one lateral side] *extending to a side of the key body opposite* to the one side, and a bridging piece for a holder linking hole to be formed therein is provided at a rear edge of the key head, in position to protrude at the opposite side of the key body, on the rear end surface of the key body, in a mechanical key storing condition, wherein the key body comprises an upper cover and a lower cover, the upper and lower covers being formed by splitting the key body in two pieces in a thickness direction, the upper cover and lower cover being mated and held together, and the mechanical key storing part being provided so as to be offset toward one of the covers, *wherein a lock pawl is provided so as to be freely slidable in a direction that intersects with a key center axis line of the mechanical key when the mechanical key is in the stored condition, and the lock pawl mates with an engaging groove provided in the side edge of the mechanical key, thereby preventing removal of the mechanical key, the lock pawl being located on the one of the covers substantially at a center part of the one of the covers.*

3. An electronic key structure according to claim [2] *1*, wherein the key body comprises an upper cover and a lower cover, and the lock pawl has a lower surface provided with a lock releasing knob protruding toward the upper surface thereof, the lock releasing knob being disposed so as to protrude from within a sliding hole provided in the lower cover or upper cover of the flat key body.

5. [An electronic key structure according to claim 1,] *An electronic key structure for electronic keys in which a key body is formed with a mechanical key storing part for at least a key plate part of a mechanical key to be stored therein, and the mechanical key is insertable into and removable from the mechanical key storing part, wherein the mechanical key storing part is located at one side of the key body, an aperture thereof is formed at a rear end surface of the key body, a key head of the mechanical key is formed with a bulge extending to a side of the key body opposite to the one side, and a bridging piece for a holder linking hole to be formed therein is provided at a rear edge of the key head, in position to protrude at the opposite side of the key body, on the rear end surface of the key body, in a mechanical key storing condition, wherein the key body comprises an upper cover and a lower cover, the upper and lower covers being formed by splitting the key body in two pieces in a thickness direction, the upper cover and lower cover being mated and held together, and the mechanical key storing part being provided so as to be offset toward one of the covers,* wherein [on] *at least on* [the other side of] the [buldge] *bulge* of the key head of the mechanical key is formed a mating part for mating with the rear end surface of the key body, and further wherein a depression *for housing the mating part* is [provided] *formed in the rear end surface of the key body at the position* corresponding to the mating part.

8. An electronic key structure according to claim 3, wherein the bridging piece at the rear edge of the key head is provided at a position of protrusion of the key body rear end surface along the key body center axis line when the mechanical key is in the stored condition, and further wherein the lock releasing knob and sliding hole in which the lock [releaing] *releasing* knob protrudes are disposed on the key body center axis line, and the bosses of the upper and lower covers are held together by a screw.

*10. An electronic key structure according to claim 1, wherein at least on the bulge of the key head of the mechanical key is formed a mating part for mating with the rear end surface of the key body, and further wherein a depression for housing the mating part is formed in the rear end surface of the key body at the position corresponding to the mating part.*

*11. An electronic key structure for electronic keys in which a key body is formed with a mechanical key storing part for at least a key plate part of a mechanical key to be stored therein, and the mechanical key is insertable into and removable from the mechanical key storing part, wherein the mechanical key storing part is located at one side of the key body, an aperture thereof is formed at a rear end surface of the key body, a key head of the mechanical key is formed with a bulge extending to a side of the key body opposite to the one side, and a bridging piece for a holder linking hole to be formed therein is provided at a rear edge of the key head, in position to protrude at the opposite side of the key body, on the rear end surface of the key body, in a mechanical key storing condition, wherein the key body comprises an upper cover and a lower cover, the upper and lower covers being formed by splitting the key body in two pieces in a thickness direction, the upper cover and lower cover being mated and held together, and the mechanical key storing part being provided so as to be offset toward one of the covers, wherein a lock pawl is provided so as to be freely slidable in a direction that intersects with a key center axis line of the mechanical key when the mechanical key is in the stored condition, and the lock pawl mates with an engaging groove provided in the side edge of the mechanical key on the same side as the bulge with respect to the key center axis, thereby preventing removal of the mechanical key, the lock pawl being located on the one of the covers substantially at a center part of the one of the covers.*

* * * * *

United States Patent
Watanuki et al.

(12) United States Patent
(10) Patent No.: US 6,460,386 B1
(45) Date of Patent: Oct. 8, 2002

(54) ELECTRONIC KEY STRUCTURE

(75) Inventors: Yoshio Watanuki, Kanagawa-ken (JP);
Satoshi Ogata, Kanagawa-ken (JP);
Tetsuyuki Tsukano, Kanagawa-ken (JP)

(73) Assignees: Nissan Motor Co., Ltd., Kanagawa (JP); Alpha Corporation, Kanagawa (JP)

( * ) Notice: Subject to any disclaimer, the term of this patent is extended or adjusted under 35 U.S.C. 154(b) by 0 days.

(21) Appl. No.: 09/590,171

(22) Filed: Jun. 9, 2000

(30) Foreign Application Priority Data

Jun. 11, 1999 (JP) ............................... 11-165682

(51) Int. Cl.[7] .............................................. A44B 15/00
(52) U.S. Cl. ...................................... 70/456 R; 70/408
(58) Field of Search .............. 70/408, 413, 456 R–460, 70/278.2

(56) References Cited

U.S. PATENT DOCUMENTS

| | | | |
|---|---|---|---|
| 2,630,212 A | * 3/1953 | Mosch | 70/456 R X |
| 4,888,970 A | * 12/1989 | Kinzler et al. | 70/456 R |
| 6,216,501 B1 | * 4/2001 | Marquardt et al. | 70/408 X |

FOREIGN PATENT DOCUMENTS

| | | | |
|---|---|---|---|
| BE | 562077 | * 11/1957 | 70/456 R |
| DE | 3314072 | * 10/1984 | |
| DE | 196 05 201 | 8/1997 | |

* cited by examiner

Primary Examiner—Suzanne Dino Barrett
(74) Attorney, Agent, or Firm—McDermott, Will & Emery

(57) ABSTRACT

A mechanical key (17) is housed in a mechanical key storing part (15) offset to one side within a key body (1), a bulge (18a) of a key head (18) being housed in an extension part (16a) of an aperture (16), a bridging part (19) that forms a holder linking hole (20) being formed so as to protrude at just the center of the rear end surface of the key body (1) thereby establishing left-to-right symmetry and avoiding an unbalanced appearance. Because the key head (18) of the mechanical key (17) can be formed so that the lever length from the key center axis line is large, it is possible to lighten the key rotational force when the mechanical key is used.

9 Claims, 4 Drawing Sheets

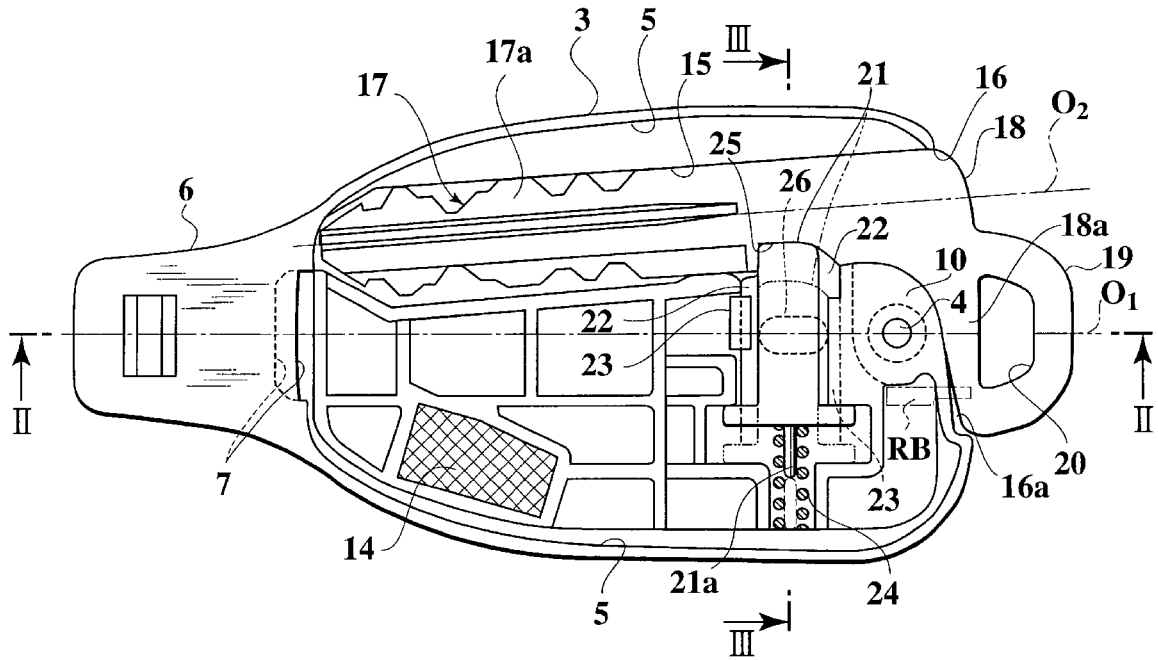

ELECTRONIC KEY STRUCTURE

BACKGROUND OF THE INVENTION

The present invention relates to a structure of an electronic key used in an electrically controlled electronic key system such as a locking apparatus.

In German Patent Application Laying-Open Publication No. DE19605201A1, an electronic key used in an electronic key system is provided with a front-to-rear extending groove-shaped mechanical key storing part on one side surface of a key body, to a mechanical key to be freely inserted into and removal from this mechanical key housing part.

SUMMARY OF THE INVENTION

With a mechanical key in the stored condition, the key head of the mechanical key protrudes to one side of the key body, so that the key is asymmetrical left-to-right, thereby marring the appearing of the key.

Additionally, because the key head of the mechanical key protrudes to one side of the key body, the key head is formed so as to be relatively small, thereby making the amount of protrusion small, this resulting in a reduction in the amount of surface along which the key head is gripped, thereby making the key rotating operation heavy.

Accordingly, in view of the above-described problems with the related art, it is an object of the present invention to provide an electronic key which, in addition to not sacrificing the attractive appearance of the key when the mechanical key is in the stored condition and achieving an attractive design, lightens the amount of force required to rotate the key when using the mechanical key.

In order to achieve the above-noted object, an aspect of the present invention is an electronic key structure for electronic keys in which a key body is formed with a mechanical key storing part for at least a key plate part of a mechanical key to be stored therein, and the mechanical key is insertable into and removable from the mechanical key storing part, wherein the mechanical key storing part is located at one side of the key body, an aperture thereof is formed at a rear end surface of the key body, a key head of the mechanical key is formed with a bulge bulging at an opposite side to the one side, and a bridging piece for a holder linking hole to be formed therein is provided at a rear edge of the key head, in position to protrude at the opposite side of the key body, on the rear end surface of the key body, in a mechanical key storing condition.

According to this aspect, by providing a bridging part in the key head so as to protrude towards the rear end surface of the key body of the mechanical key, there is not much feeling of a protrusion of the bridging piece of the key head when a key body formed as to be relatively long is grasped in the hand in storing the plate part of a mechanical key in the mechanical key storing part. Additionally, this bridging piece, which forms the holder linking hole of the mechanical key is located towards the other side of the center of the rear end surface of the key body, as if it were a holder linking piece linking the key body to a key holder or the like, thereby enhancing the appearance, and even if there is a key holder or the like, it is positioning at the rear end in the longitudinal direction of the key body, so that it does not interfere with grasping of the key body.

Because the mechanical key storing part is offset towards one side within the key body, it is possible to enhance the degree of freedom in laying out various function components housed within the key body.

Because it is possible to form the bulge that bulges to one side of the key head of the mechanical key and to establish a relatively large lever length of the key head from the key center axis line, and also because it is possible, with a bridging piece provided so as to protrude from the bulge, to establish a large amount of grasping surface area, it is possible to lighten the key rotational operating force when using the mechanical key.

BRIEF DESCRIPTION OF THE DRAWINGS

The above and further objects and novel features of the present invention will more fully appear from the following detailed description when the same is read in conjunction with the accompanying drawings, in which.

DESCRIPTION OF THE PREFERRED EMBODIMENTS

Figure 1:
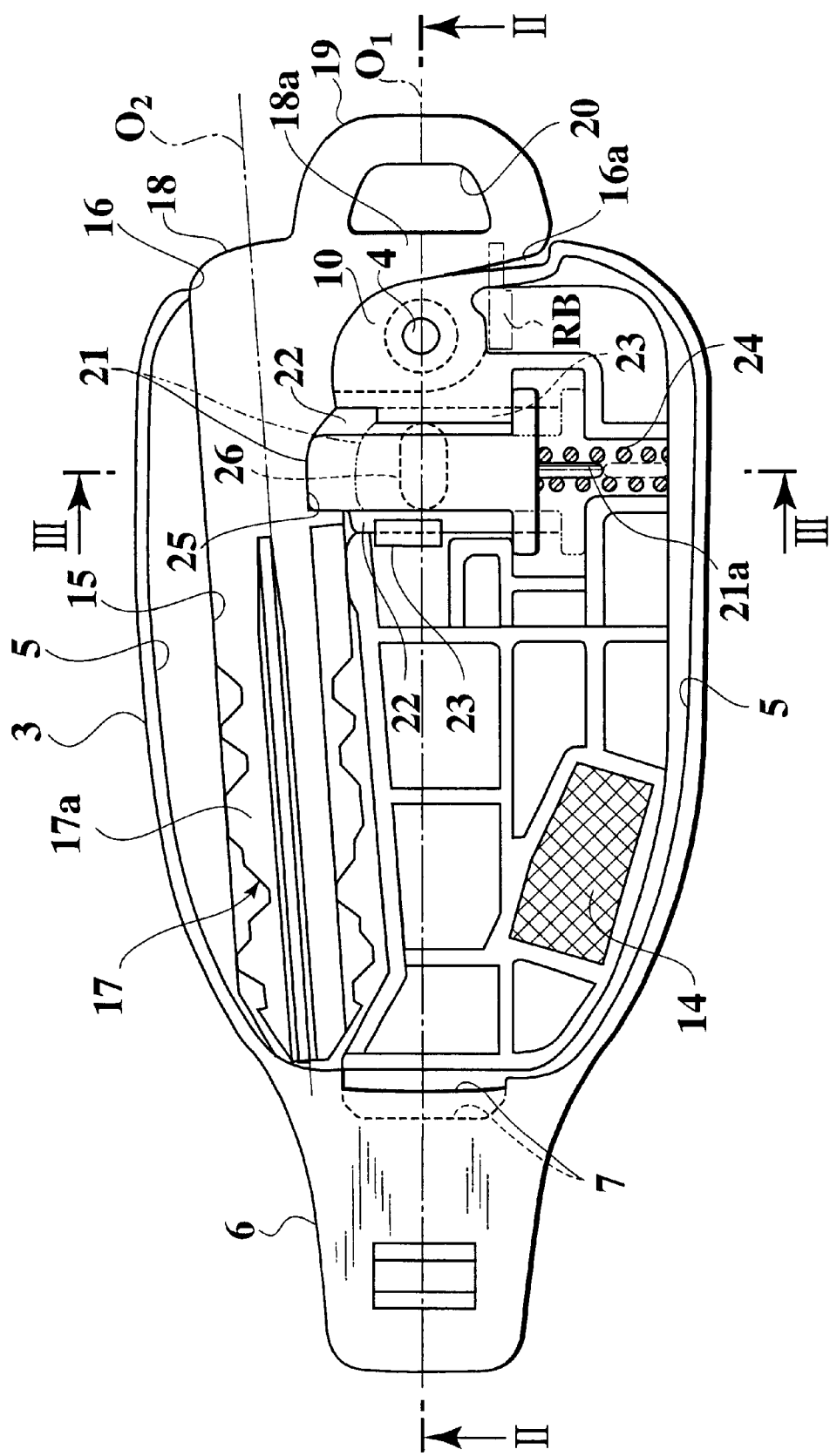
FIG. 1 is a plan view showing an electronic key according to an embodiment of the present invention, with an upper cover removed.
Figure 2:
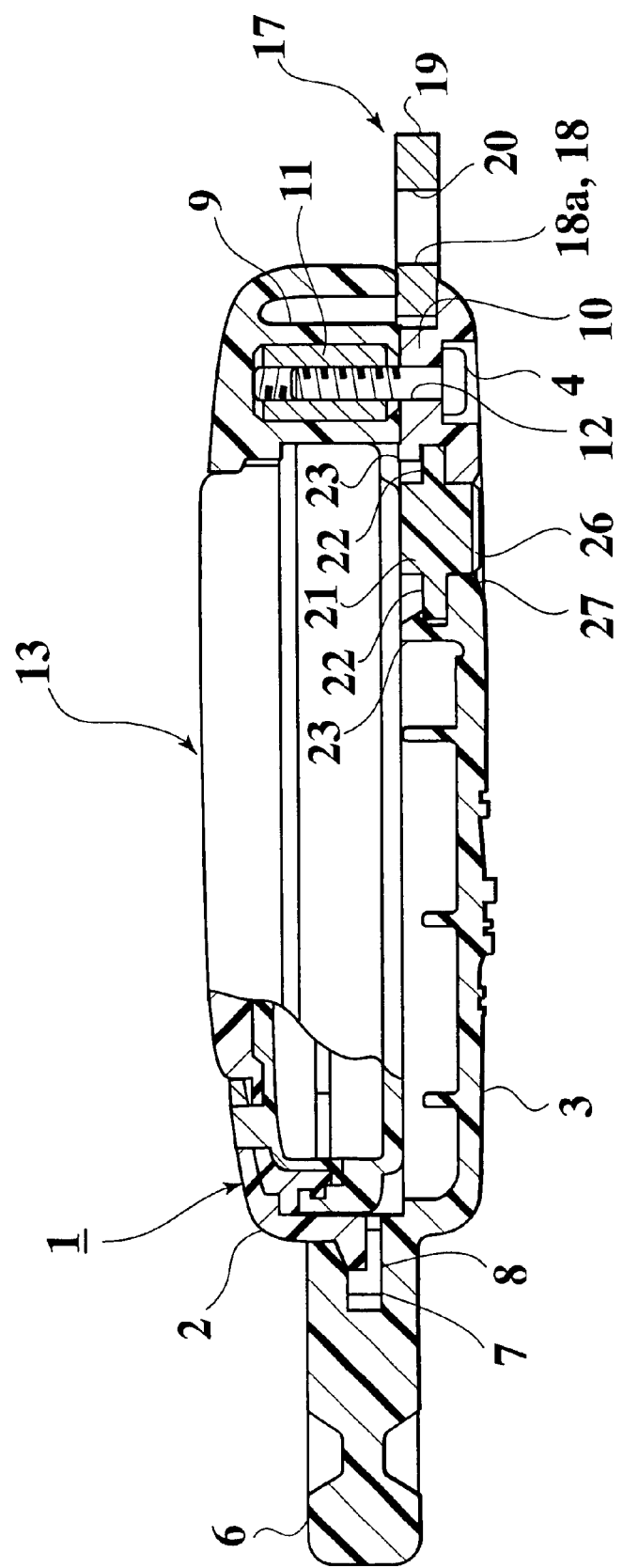
FIG. 2 is a cross-sectional view along line II—II of FIG. 1.
Figure 3:
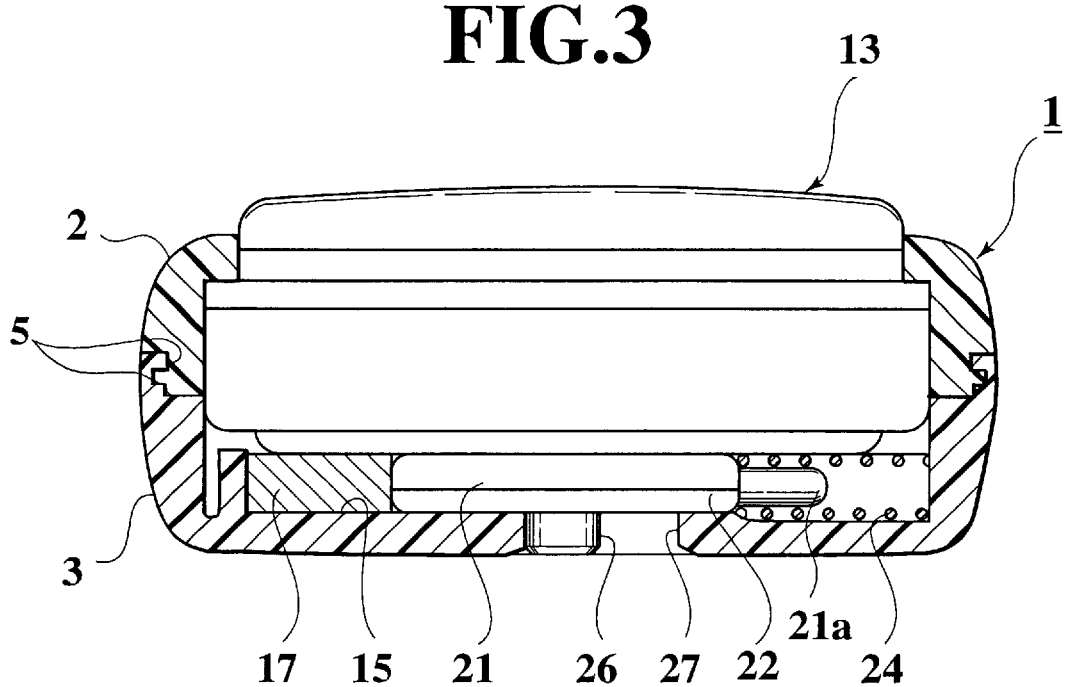
FIG. 3 is a cross-sectional view along line III—III of FIG. 1.
Figure 4:
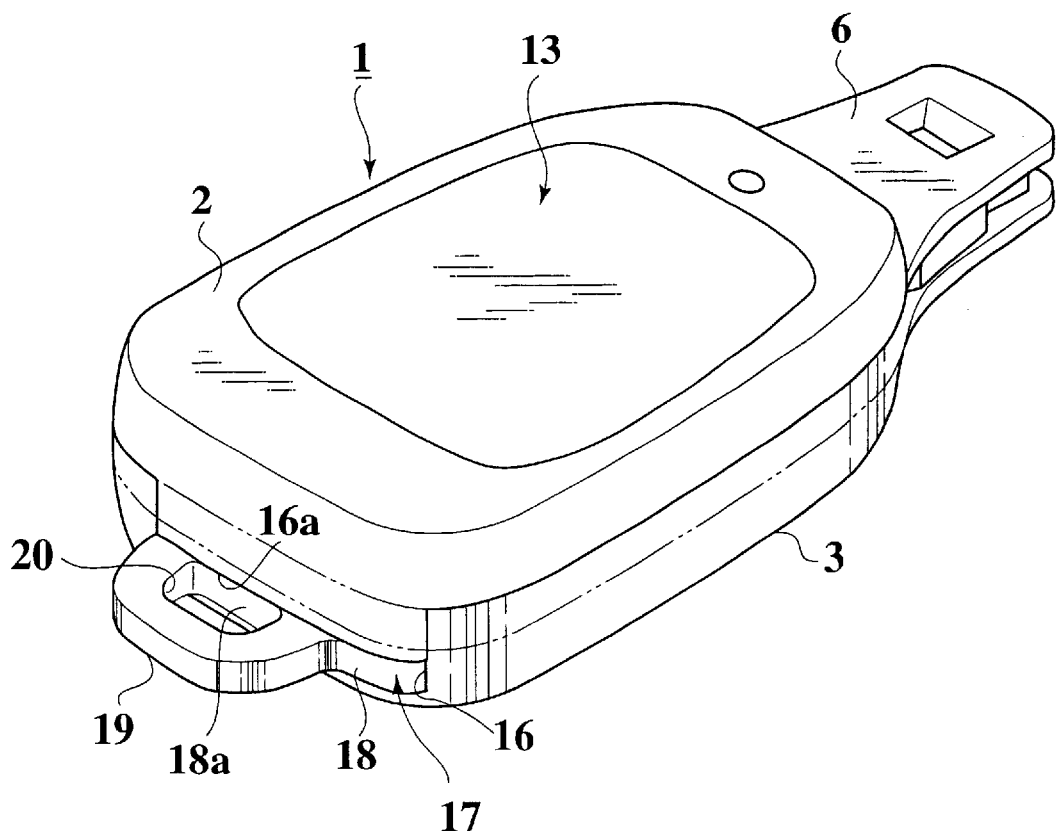
FIG. 4 is a perspective view of the electronic key from the upper cover side.
Figure 5:
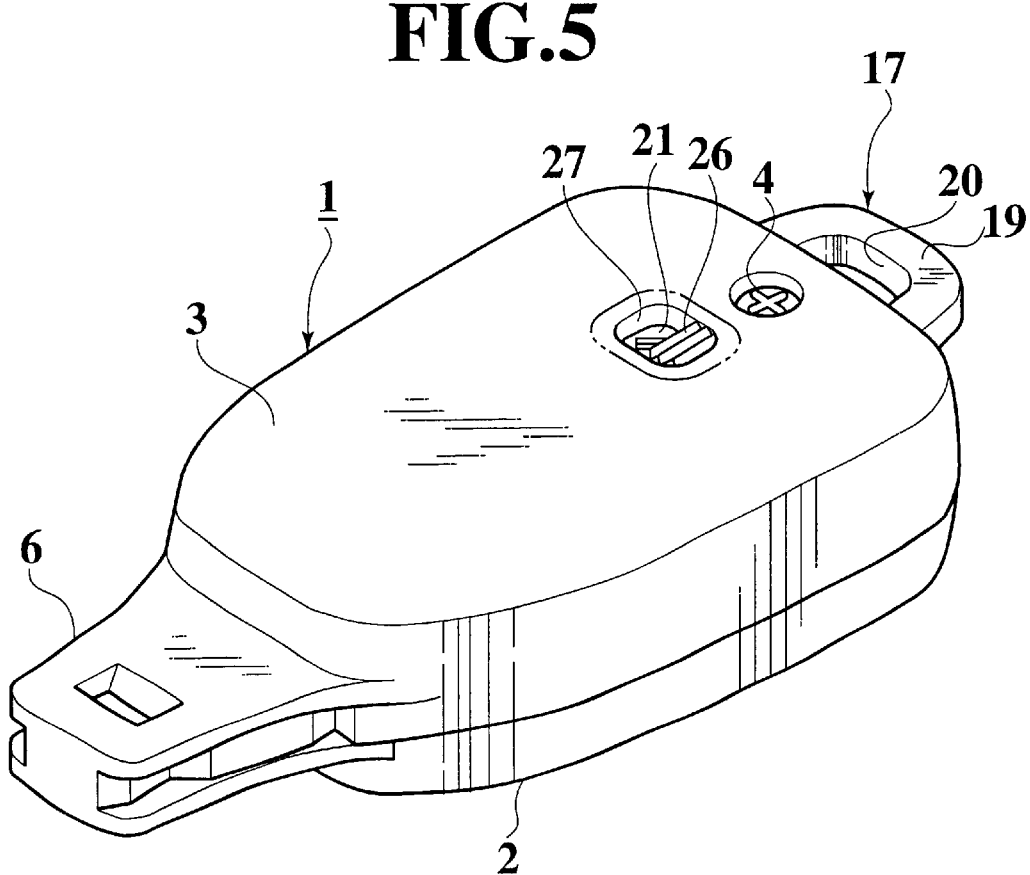
FIG. 5 is a perspective view of the electronic key from the lower cover side.

A preferred embodiment of the present invention are described in detail below, with reference made to relevant accompanying drawings.

In FIG. 1 to FIG. 6, reference numeral 1 denotes a key body of an electronic key, which in this embodiment is made up of flat upper and lower covers 2 and 3, made of synthetic resin, so that the key body is divided into two pieces in the thickness direction, the upper cover 2 and the lower cover 3 being mated and held together by a screw 4.

Figure 6:
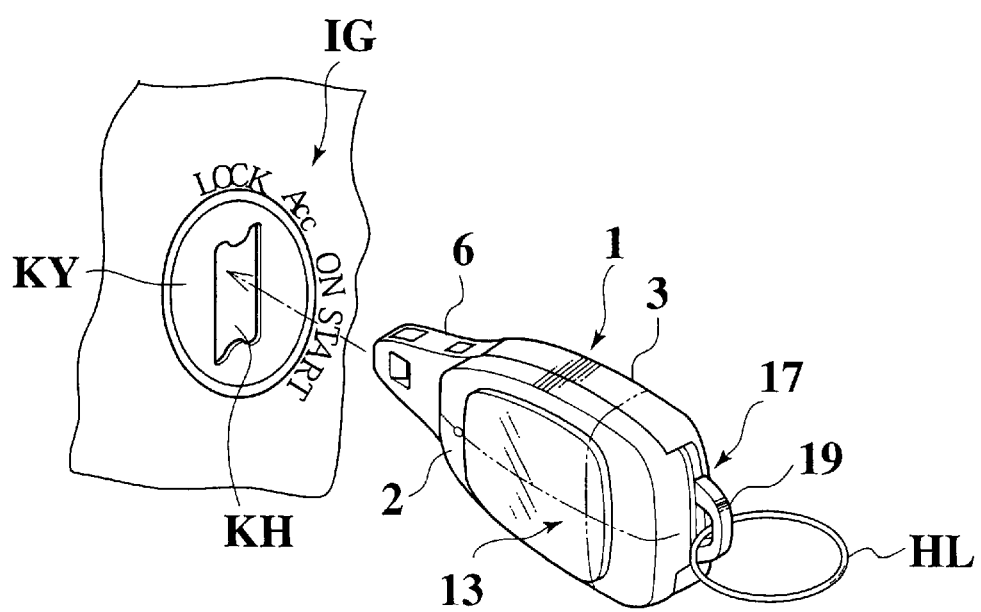
FIG. 6 is a perspective view of the electronic key applied to an ignition switch of a vehicle.

More specifically, a tongue-and-groove mating groove 5 is provided along the periphery of the mating parts of the upper cover 2 and the lower cover 3, and an insertion part 6 of the key body 1 that is inserted into a key insertion hole KH (rotating switch part) of a key cylinder KY shown in FIG. 6 is integrally formed with the front end part of the lower cover 3, a socket part 7 being provided at the molded base part of the insertion part 6 and a mating protrusion 8 being provided at the front end of the upper cover 2, so that with the mating protrusion 8 inserted into and mated with the socket part 7, the tongue-and-groove mating grooves 5 are fitted together.

Bosses 9 and 10 are provided so as to protrude on the insides the rear ends of the upper cover 2 and the lower cover 3, respectively, along the key boy center axis line.

The holding action of the screw 4 is done at the bosses 9 and 10, and in this embodiment the boss 9 of the upper cover 2 is made long and a molded nut 11 is formed, with a through hole 12 being provided in the boss 10 of the lower cover 3, the bosses 9 and 10 being butted up against each other, the screw 4 being passed through the hole 12 from the lower cover 3 and threaded into the nut 11, thereby holding the cover pieces together. While the screw 4 can be directly screwed into the boss 9, by doing this via the nut 11, it is possible to reliably establish force applied to the holder linking hole 20 to be described below.

A mechanical key storing part 15 is provided toward the front of the inside of the key body 1, offset toward one side thereof, an aperture 16 thereof being provided on the rear end surface of the key body 1.

The aperture 16 has an extension part 16a as a depression that extends to the center part of the rear end surface of the key body 1.

The reference numeral 17 denotes a metal mechanical key having a key plate 17a that fits into the mechanical key storing part 15, the key head 18 thereof having a bulge 18a offset in an L-shape to the other side from the key center axis line $O_2$, this bulge 18a serving as a mating part fitted into the extension part 16a of the aperture 16.

The key head 18 is formed so that the rear edge thereof is aligned substantially flush with the rear end surface of the key body when stored in the mechanical key storing part, and also is provided with a bridging piece 19 forming a holder linking hole for attachment of a key holder HL or a tag, this bridging piece 19 protruding along the key body center axis line $O_1$ when the mechanical key is in the stored condition.

In this embodiment, a keyless module 13 that remotely controls a door lock mechanism or trunk opener or the like (not shown in the drawing) is fitted into substantially all of the inside of the upper cover 2. Thus, the mechanical key storing part 15 and the aperture 16 thereof are formed offset toward the lower cover 3, so that the upper side of the mechanical key storing part 15 is formed on the lower side of the keyless module 13 with a spacing therebetween, on the upper edge of the aperture 16 at the rear end of the upper cover 2.

As described above, in this embodiment a keyless module 13 is disposed inside the upper cover 2, and a mechanical key storing part 15 is provided offset to one side of the lower cover 3, a circuit chip 14 which performs transmission and reception with respect to an antenna coil (not shown in the drawing) and ID verification being disposed offset toward other side inside the lower cover 3.

If the ID verification is passed, a lock (not shown in the drawing) of the cylinder KT of an ignition switch IG provided on an instrument panel of a vehicle, for example, is released, enabling the key body 1 to be used to rotate the cylinder KY.

A lock pawl 21 that prevents removal of the mechanical key 17 is provided inside the lower cover 3, in proximity to the aperture 16 of the mechanical key storing part 15.

Guides 22 are integrally formed on both side edges of the lock pawl 21, these mating with guide rails 23 integrally formed with the lower cover 3, and being provided so as to be freely slidable in a direction that intersects with the key center axis line $O_2$ of the mechanical key 17 when in the stored condition in the mechanical key storing part 15. A spring 24 which is resiliently provided on a protruding pin 21a at the rear end of the lock pawl continuously impels the pawl tip to protrude within the mechanical key storing part 15, and when the mechanical key 17 is inserted up to a prescribed position in the mechanical key storing part 15, the pawl tip falls into a mating groove 25 provided at the side edge between the key plate 17a of the mechanical key 17 and the key head 18, thereby engaging into the engaging groove 25, so as to lock the mechanical key and prevent it from being pulled out.

In this embodiment, one of the guide rails 23 is formed on the front side of the boss 10 of the lower cover 3, the lock pawl 21 being provided so as to come into contact with the front part of the boss 10.

The lock releasing knob 26 is provided so as to protrude at the lower surface of the lock pawl 21, the part of the lock pawl corresponding to the lock releasing knob 26 has a sliding hole 27 formed in it in which the lock releasing knob 26 is housed, so that the lock releasing knob 26 is exposed to the outside from the sliding hole 27, enabling the operation of the lock releasing knob 26, thereby releasing the lock.

According to the above-described structure, the mechanical key 17 is inserted into the aperture 16 at the rear end surface of the key body 1, so that it is stored into the mechanical key storing part 15 within the key body 1, and prevented from being removed by the lock pawl 21, thereby holding the mechanical key together with the key body 1.

When using the mechanical key 17, if the lock releasing knob 26 is pressed by the fingertip against the spring force of the spring 24, so that it slides, the end of the lock pawl 21 is removed from its engagement with the engaging groove 25 of the mechanical key 17, thereby releasing the engagement between the two elements, and allowing the mechanical key 17 to be gripped by the bridging piece 19 and easily pulled out from the key body 1.

With the mechanical key 17 in the stored condition, the bridging piece 19 provided on the key head 18 of the mechanical key 17 protrudes along the key body center axis line $O_1$ at the rear end surface of the key body 1, so that the appearance of the key is one of left-to-right symmetry, and the bridging piece 19 forming the holder linking hole 2 of the mechanical key 17 is located at the center part of the rear end surface of the key body, as if it were a holder linking piece linking the key body 1 to a key holder HL or the like, thereby enhancing the outer appearance of the key. In particular, because the rear edge of the key head 18 is adjusted so as to be substantially flush with the rear end surface of the key body 1, only the bridging piece 19 protrudes from the rear end surface of the key body 1, the result being the appearance that the key body 1 and the mechanical key 17 are formed as one, thereby further enhancing appearance.

There is not much feeling of a protrusion of the bridging piece 19 of the key head 18 when the key body 1 formed as to be relatively long is grasped in the hand in storing the key plate 17a of the mechanical key 17 in the mechanical key storing part 15, and even if there is a key holder HL or the like, it is positioning at the rear end in the longitudinal direction of the key body 1, so that it does not interfere with grasping of the key body 1. When the key body 1 is inserted into the key cylinder KY of an ignition switch IG provided on an instrument panel or the like of a vehicle, and rotated from an off position to an on position, because the key holder HL or the like is located substantially at the center of rotation of the key body, the key holder HL or the like does not interfere with the rotation operation.

Additionally, the bulge 18a of the key head 18 is housed in and engages with an extension part 16a formed as a depression in the rear end surface of the key body 1, so that when the mechanical key 17 is in the stored condition, even if a returning force acts from about the key body center axis line $O_1$ from the holder linking hole 20 of the mechanical key 17, because of the engagement between the bulge 18a and the extension part 16a, the returning force is dispersed, along with a mating between the key plate 17a on one side and the mechanical key storing part 15.

The mechanical key storing part 15 is caused to be offset toward one side within the key body 1, so that the center part of the key body 1 can be freely used, thereby providing an enhanced degree of freedom in layout of a circuit chip 14 or keyless module 13 and the lock pawl 21 and the like that are housed within the key body 1.

In particular, by forming the key body 1 so as to have a split structure, with an upper and a lower cover 2 and 3, respectively, these being mated and held together, the assembly the above-noted functional components is facilitated. By providing the mechanical key storing part 15 offset to the side of the lower cover 3, it is possible to use substantially all of the upper cover 2 side as a storage area, thereby further enhancing the degree of freedom of in layout of the above-noted functional parts on the side opposite the lower cover 3.

Because the lock pawl 21 is disposed in the center part of the inside rear end of the lower cover 3, the placement of the lock pawl 21 and the spring 24 for impelling the lock pawl 21 is facilitated, and it is possible to achieve a sufficient length of the spring 24, thereby enabling establishment of a proper impelling force. By doing this, the mechanical key 17 is pressed against one side of the mechanical key storing part 15, thereby taking up the looseness within the mechanical key storing part 15.

Because the lock releasing knob 26 of the lock pawl 21 and the sliding hole 27 at which the lock releasing knob 26 is exposed can be placed at the center part of the surface of the lower cover 3, which has a relatively large surface, the degree of freedom in establishing the size of the operating part is increased, making it easier to operate the knob with the fingertips.

Additionally, because the lock releasing knob 26, the sliding hole 27, the screw 4, and the holder linking hole 20 formed by the bridging piece 19 can be located along substantially one straight line at the center part of the lower cover 3, these can be aligned neatly, thereby improving appearance.

Additionally, because the lock pawl 21 is provided so as to be in contact with the front part of the boss 10 of the lower cover 3, if an excessive load acts in a direction to pull the mechanical key 17, this load is received by the boss 10 of the lower cover 3, about the screw 4 as a pivot via the lock pawl 21, so that there is reliable prevention of the mechanical key from accidentally falling out, thereby improving the feeling of quality and reliability.

A bulge 18a that is housed in the extension part 16a provided in the aperture 16 of the mechanical key 15 is formed on the key head 18 of the mechanical key 17, and it is possible to establish a relatively large lever length of the key head 18 from the key center axis line $O_2$, and also because it is possible, with the bridging piece 19 provided so as to protrude from the bulge 18a, to establish a large amount of grasping surface area on the key head 18, it is possible to lighten the key rotational operating force (operating torque) when using the mechanical key.

It will be understood that the present invention is not restricted to the above-noted exemplary embodiment, but can take on various forms within the scope and spirit of the claims. For example, it is not absolutely necessary that the entire bulge 18a of the mechanical key 17 be housed inside the extension part 16a, and possible for a part of the bulge 18a on the other side protrude in parallel with the key plate 17a, with a corresponding depression being provided on the rear end surface of the key body 1 in place of the extension part 16a. It is also possible, as shown by the broken line in FIG. 1, to cause part of a rubber member RB to protrude from within the lower cover 3 toward the extension part 16a, so that it is possible to come into resilient contact with the bulge 18a of the key head 18, so that by applying a slight force in the mechanical key 17 pull-out direction, looseness of the mechanical key 17 is taken up.

In order to use the mechanical key 17 in an emergency in a case in which the ID verification of the electronic key fails, it is possible to insert it as well into the key insertion hole KH of the key cylinder KY and can in particular be used to open and close a glove compartment (not shown in the drawing) of a vehicle. Thus, by placing objects into the glove compartment and locking the compartment using the mechanical key 17, it is not possible to open the glove compartment using the key body 1 with an ID verification, thereby providing safe storage for valuables.

It will further be understood that the electronic key according to the present invention is not limited in application to a vehicle, and can be applied as well to other cases in which an ID verification (electronic key) is used to open a lock, for example at the entrance door to a safe room having a plurality of separate safes, or in the case of using a mechanical key to open a lock, such as in a door lock mechanism or the like.

As will be seen from the foregoing embodiment, according to an aspect of the present invention, the key body is made up of an upper cover and a lower cover, these being formed by splitting the key body in two pieces in the thickness direction, the upper cover and lower cover being mated and held together, and the mechanical key storing part being provided so as to be offset toward one of the covers.

According to this aspect, by forming the key body by an upper cover and a lower cover and mating and holding these covers together, the housing of various functional components within the key body is facilitated.

Because the mechanical key storing part is provided offset to the side of one of the covers, it is possible to use substantially all of the other cover to house functional components, thereby enhancing the degree of freedom in layout.

According to another aspect of the present, a lock pawl is provided so as to be freely slidable in a direction that intersects with a key center axis line of the mechanical key when the mechanical key is in the stored condition, the lock pawl being impelled by a resilient member, so that its end mates with an engaging groove provided in the side edge of the mechanical key, thereby preventing removal of the mechanical key.

According to this aspect, because the lock pawl prevents the removal of the mechanical key when in the stored condition, it is possible to prevent the mechanical key from accidentally falling out of position, and also possible to enhance the feeling of quality and the reliability.

By allowing the lock pawl to freely slide in a direction that intersects with key center axis line of the mechanical key when in the stored condition in the mechanical key storing part, the end of the pawl being mated into an engaging groove at a side edge of the mechanical key, enabling the lock pawl to be located substantially at the center part of the key body, layout of the lock pawl and the resilient member that serves to impel the lock pawl is facilitated, and it is possible to establish a sufficient length of the resilient member, thereby providing proper impelling force therefrom.

According to another aspect of the present invention, the lock pawl has a lower surface provided with a lock releasing knob protruding toward the upper surface thereof, the lock releasing knob being disposed so as to protrude from within a sliding hole provided in the lower cover or upper cover of the flat key body.

According to this aspect, by providing the lock releasing knob, which protrudes from within a sliding hole provided on either the lower or upper cover of the flat key body, it is possible to provide the lock releasing knob and sliding hole on a relatively broad surface part of the cover, thereby enhancing the degree of freedom in establishing the size of the operating part, enabling improvement of operability of the knob by the fingers.

According to another aspect of the present invention, the upper and lower covers have a boss provided at a center position on the rear edge of the inside thereof, these bosses being butted up against one another and held tight, the lock pawl that prevents removal of the mechanical key being provided so as to be in contact with a front part of the bosses.

According to this aspect, when a large load acts in the direction of pulling out the mechanical key, this load is received by the boss part of the cover via the lock pawl so the resistance force is large, thereby reliably preventing separation of the mechanical key and enhancing the feeling of quality and reliability.

According to another aspect of the present invention, on at least on the other side of the bulge of the key head of the mechanical key is formed a mating part for mating with the rear end surface of the key body, and further wherein a depression is provided corresponding to the mating part.

According to this aspect, when the mechanical key is stored, even if a returning force acts from the holder linking hole of the mechanical key, because of the engagement between the other side of the bulge and the depression, the returning force is dispersed, along with a mating between the key plate on one side and the mechanical key storing part.

According to another aspect of the present invention, the depression on the rear end surface of the key body is formed by an extension that extends to the center part of the rear end surface the key body from an aperture of the mechanical key storing part, the bulge being housed in the extension, and the rear edge of the mechanical key being formed so as to be substantially flush with the rear end surface of the key body when the mechanical key is in the stored condition.

According to the seventh aspect of the present invention, because the rear end of the key head of the mechanical key stored in the mechanical key storing part is substantially flush with the rear end surface of the key body, only the bridging piece protrudes from the read end surface, making it possible to achieve a unitized appearance of the key body and mechanical key, thereby improving the outer appearance.

According to another aspect of the present invention, the bridging piece at the rear edge of the key head is provided at a position of protrusion of the key body rear end surface along the key body center axis line when the mechanical key is in the stored condition.

According to this aspect, because the bridging piece at the rear edge of the key head is provided at a position of protrusion of the key body rear end surface along the key body center axis line when the mechanical key is in the stored condition, it is possible to achieve left-to-right symmetry and avoid an unbalanced appearance.

According to another aspect of the present invention, the bridging piece at the rear edge of the key head is provided at a position of protrusion of the key body rear end surface along the key body center axis line when the mechanical key is in the stored condition, and wherein the lock releasing knob and sliding hole in which the lock releasing knob protrudes are disposed on the key body center axis line, and the bosses of the upper and lower covers are held together by a screw.

According to this aspect, because the bridging piece provided on the key head of the mechanical key protrudes along the key body center axis line on the rear end surface of the key body when the mechanical key is in the stored condition, it is possible to achieve left-to-right symmetry and avoid an unbalanced appearance. In addition, by disposing the lock releasing knob, sliding hole, screw, and holder linking hole formed by the bridge along substantially one straight line at the center part of the cover, it is possible to enhance appearance.

According to another aspect of the present invention, an insertion part is provided on the front end of the key body, inserted into a rotating switch, thereby enabling the rotating switch to be rotated by the key body.

According to this aspect, by even when the key body is inserted into a switch and rotated from an off position to an on position, because the key holder or the like is located substantially at the center of rotation of the key body, the key holder or the like does not interfere with the rotation operation.

The contents of Japanese Patent Application No. 11-165682 are incorporated herein by reference.

While the present invention has been described using specific terms, such description is for illustrative purposes, and it is to be understood that changes and variations may be made without departing from the spirit or scope of the following claims.

What is claimed is:

1. An electronic key structure for electronic keys in which a key body is formed with a mechanical key storing part for at least a key plate part of a mechanical key to be stored therein, and the mechanical key is insertable into and removable from the mechanical key storing part, wherein the mechanical key storing part is located at one side of the key body, an aperture thereof is formed at a rear end surface of the key body, a key head of the mechanical key is formed with a bulge bulging at one lateral side to the one side, and a bridging piece for a holder linking hole to be formed therein is provided at a rear edge of the key head, in position to protrude at the opposite side of the key body, on the rear end surface of the key body, in a mechanical key storing condition, wherein the key body comprises an upper cover and a lower cover, the upper and lower covers being formed by splitting the key body in two pieces in a thickness direction, the upper cover and lower cover being mated and held together, and the mechanical key storing part being provided so as to be offset toward one of the covers.

2. An electronic key structure according to claim 1, wherein a lock pawl is provided so as to be freely slidable in a direction that intersects with a key center axis line of the mechanical key when the mechanical key is in the stored condition, the lock pawl being impelled by a resilient member, so that one end of the lock pawl mates with an engaging groove provided in the side edge of the mechanical key, thereby preventing removal of the mechanical key.

3. An electronic key structure according to claim 2, wherein the key body comprises an upper cover and a lower cover, and the lock pawl has a lower surface provided with a lock releasing knob protruding toward the upper surface thereof, the lock releasing knob being disposed so as to protrude from within a sliding hole provided in the lower cover or upper cover of the flat key body.

4. An electronic key structure according to claim 1, wherein the upper and lower covers have a boss provided at a center position on a rear edge of the inside thereof, the bosses being butted up against one another and held tight, the lock pawl that prevents removal of the mechanical key being provided so as to be in contact with a front part of the bosses.

5. An electronic key structure according to claim 1, wherein on at least on the other side of the buldge of the key head of the mechanical key is formed a mating part for mating with the rear end surface of the key body, and further wherein a depression is provided corresponding to the mating part.

6. An electronic key structure according to claim 5, wherein the depression on the rear end surface of the key body is formed by an extension part that extends to the center part of a rear end surface the key body from an aperture of the mechanical key storing part, the bulge being housed in the extension, and the rear edge of the mechanical key being formed so as to be substantially flush with the rear end surface of the key body when the mechanical key is in the stored condition.

7. An electronic key structure according to claim 1, wherein the bridging piece at the rear edge of the key head is provided at a position of protrusion of the key body rear end surface along the key body center axis line when the mechanical key is in the stored condition.

8. An electronic key structure according to claim 3, wherein the bridging piece at the rear edge of the key head is provided at a position of protrusion of the key body rear end surface along the key body center axis line when the mechanical key is in the stored condition, and further wherein the lock releasing knob and sliding hole in which the lock releaing knob protrudes are disposed on the key body center axis line, and the bosses of the upper and lower covers are held together by a screw.

9. An electronic key structure according to claim 4, wherein an insertion part is provided on the front end of the key body, inserted into and mated to a rotating switch, thereby enabling the rotating switch to be rotated by the key body.

* * * * *